United States Patent
Beecroft et al.

(10) Patent No.: US 8,542,679 B2
(45) Date of Patent: Sep. 24, 2013

(54) METHOD OF CONTROLLING DATA PROPAGATION WITHIN A NETWORK

(75) Inventors: Jon Beecroft, Bristol (GB); Edward James Turner, Bristol (GB); Anthony Michael Ford, Bristol (GB); David Charles Hewson, Bristol (GB)

(73) Assignee: Gnodal Limited, Bristol (GB)

( * ) Notice: Subject to any disclaimer, the term of this patent is extended or adjusted under 35 U.S.C. 154(b) by 129 days.

(21) Appl. No.: 13/003,177

(22) PCT Filed: Jul. 8, 2009

(86) PCT No.: PCT/GB2009/001695
§ 371 (c)(1),
(2), (4) Date: Feb. 21, 2011

(87) PCT Pub. No.: WO2010/004277
PCT Pub. Date: Jan. 14, 2010

(65) Prior Publication Data
US 2011/0149969 A1    Jun. 23, 2011

(30) Foreign Application Priority Data
Jul. 8, 2008    (GB) .................................. 0812460.4

(51) Int. Cl.
*H04L 12/28*    (2006.01)

(52) U.S. Cl.
USPC ............................ 370/389; 370/401; 370/392

(58) Field of Classification Search
None
See application file for complete search history.

(56) References Cited

U.S. PATENT DOCUMENTS

| | | | | |
|---|---|---|---|---|
| 6,735,198 B1 * | 5/2004 | Edsall et al. | ................ | 370/389 |
| 6,895,433 B1 * | 5/2005 | Slater et al. | ................ | 709/220 |
| 2003/0118035 A1 | 6/2003 | Sharma et al. | | |
| 2004/0028048 A1 | 2/2004 | Jin | | |
| 2007/0274295 A1 | 11/2007 | Nishimura et al. | | |
| 2008/0130503 A1 | 6/2008 | Kaempfer | | |
| 2009/0019135 A1 * | 1/2009 | Eswaran et al. | ............... | 709/219 |

FOREIGN PATENT DOCUMENTS

CN    1996934 A    7/2007

OTHER PUBLICATIONS

International Search Report; mailed Sep. 24, 2009; Authorized Officer—Athanasios Mariggis.

* cited by examiner

*Primary Examiner* — Duc C Ho
(74) *Attorney, Agent, or Firm* — Winstead PC

(57) ABSTRACT

The present invention provides a method of limiting the frequency of floods within a data network, the floods arising as a data frame is routed to an unknown destination, the method comprising the steps of: receiving on an ingress port a data frame intended for a destination station and containing a MAC address of that station; checking the destination MAC address with the contents of a MAC table; and thereby determining whether the data frame is to be routed, discarded or flooded to all ports except the ingress port; and respectively routing, discarding or flooding the data frame to all ports except the ingress port. The present invention further provides a method of populating a MAC table within an Ethernet network with entries relating a MAC station address to a port to which it is connected, the method comprising the steps of: receiving on an ingress port a data frame intended for a destination station and containing a MAC address of that station; checking the destination MAC address with the contents of a MAC table; and thereby determining whether the destination MAC address and ingress port are to be written to the MAC table and, if so writing the destination MAC address and ingress port to the MAC table; and flooding the data frame to all ports except the ingress port.

23 Claims, 4 Drawing Sheets

V     Valid entry
S     Static. If set will not be aged out.
AR    Age Rate. This defines the rate of aging.
AV    Age Value. Normally only one bit. Reset whenever the MAC table entry is accessed.
DC    Destination Created. This is set when the entry is created by a destination lookup.

METHOD OF CONTROLLING DATA PROPAGATION WITHIN A NETWORK

The present invention relates to a data network and, in particular, to a method of preventing the adverse effects of cascading duplicate data creation and circulation within a network. It also relates to an Ethernet bridge through which data flow is controlled in order to prevent the above adverse effects.

Computers and their peripheral devices are commonly linked together in a data network. A device that implements network services is called a "station". There are two types of station:

End Stations are the ultimate source and destination of network data communicated across a network.

Intermediate Stations forward network data generated by End Stations between source and destination. An intermediate station which forwards data frames is commonly called a "Bridge".

Ethernet is rapidly becoming the most commonly used data network, partly as a result of the ease with which End Stations may be connected to and addressed by the network. This advantage is achieved by the design of the Ethernet bridge, which is given the facility to learn automatically the addresses of the End Stations to which it is connected, either directly or via other Intermediate Stations. The learning process is dynamic in that it adapts to changing or loss of connections and is performed automatically every time a bridge is powered up. This saves the network administrator considerable time and effort.

Ethernet data is encapsulated into Ethernet frames for transmission between End Stations. Each frame has a header containing a pair of End Station addresses that is used to direct the frame between a source and a destination. Ethernet End Station addresses are defined by the IEEE 802 standard Medium Access Control (MAC) address space, each network-attached device having a unique MAC address assigned during manufacture.

FIG. 1 shows a simple data network 10 containing an Ethernet bridge 12 with eight connection ports 14a-h. Three client computers 16a, 16b, 16c and four servers 18a, 18b, 18c, 18d are connected respectively to seven of the eight connection ports. Data linking the MAC address of each client 16 and server 18 to an identifier of the bridge port 14a-h to which it is connected is stored by the bridge 12 in a MAC address table. The MAC address table is then used by the bridge 12 to route Ethernet frames from an ingress port to the correct egress port for the destination, as indicated in the header of the transmitted frame.

In a typical client/server application, the client 16 would normally initiate a communication with a request for a service provided by a server 18. The server 18 would then respond and, in so doing, send a communication to the client 16. At the Data Link Layer, the initial communication is in the form of a frame or series of frames with headers containing the source and destination MAC addresses. In this example, the source MAC address is that of the client and the destination MAC address that of the relevant server. The server would then reply by sending a series of Ethernet frames in which the source MAC address is that of the server and the destination MAC address that of the client.

As indicated previously, the advantage of an Ethernet link is that it is not necessary for an administrator to configure the network with MAC/connection port mapping data. This data is learned automatically by each bridge 12 in a network at initial power-on. That is, the MAC address table is initially empty and must be populated automatically by the network. The bridge 12 must also be capable of recognising when a particular client 16 or server 18 has been removed from a network or reconnected to a different connection port 14 and of updating the MAC table accordingly.

Consider now the network shown in FIG. 1 just after the bridge 12 has been powered up. In this situation, there will be no valid entries in the MAC table. In a typical client/server application, a client 16, connected to the bridge 12 via a port 14a-h, will issue to the bridge 12 a frame whose header contains source and destination MAC addresses. The source address will be the MAC address of its own Ethernet adapters and the destination MAC address will point to the server 18. The bridge 12 will take the source MAC address and load it into the MAC table along with the ingress port number on which the frame arrived. It will then perform a lookup operation on the destination MAC address. As this is the first reference to the destination MAC address, the MAC table will not hold a valid MAC entry indicating the egress port to take. The bridge 12 will now either discard the frame or route it to all ports except the ingress port on which it arrived. This latter course of action is termed a flood. The ingress port is, of course, not included in the flood as the destination cannot be the source. Discarding the frame, because of errors or over commitment, is a valid action although, in this case, it will not move the process forward as any subsequent attempts to deliver the frame would be left with the same option. A flood will mean that the frame ultimately arrives at the destination server through one of the ports 14a-h, although which one is not currently understood by the bridge 12. The flooded frame will also arrive at the other clients 16 and servers 18 attached to the bridge 12. End Stations that do not have the MAC address of the destination are required to discard the frame. The destination server however should receive and interpret the frame.

Once the frame is correctly interpreted, the destination server prepares a response that incorporates its own MAC address as the source and the client's MAC address as the destination. This frame will in turn be sent to the bridge 12 and again the source MAC address is loaded into the MAC table along with the ingress port on which the frame arrived. This time however, the MAC table lookup of the destination client MAC address will return the previously-populated port of the client and the frame can be delivered directly back to the client through that port. As the server acts as source by virtue of its response to the client, its own MAC address is written into the MAC table. Any subsequent frames that are sent by the client to the server will therefore be delivered directly to the server without the need for flooding.

Other clients 16 wishing to communicate with the server 18 would also load their source MAC address into the MAC table when their first Ethernet frame is input to the bridge 12. The bridge 12 would, of course, find that the MAC address of the destination server contained in these frames is already loaded into the MAC table. These frames are therefore delivered to their target destination without the need for flooding.

FIG. 2 illustrates a slightly more complicated network 20 relative to that shown in FIG. 1. In this network 20, in which components also present in FIG. 1 are given the same reference, two bridges 12a, 12b are shown linking client 16a, 16b, 16c and server 18a, 18b, 18c, 18d End Stations. The first bridge 12a has connection ports 14a-h and the second 12b has ports 22a-h. In this arrangement, on power up, the client 16a that is first to issue an Ethernet frame would pass it to the first bridge 12a. Having no entries in its MAC table, the first bridge 12 then floods the frame out through all ports 14a-h, except the ingress port 14a. The flood causes the frame to be delivered to the second bridge 12b along a connecting link 24.

The second bridge 12b, also having an empty MAC table, also floods the frame out through all its ports 22a-h, except the ingress port 22d. This frame, after the second flood, is received by all servers 18, including the intended destination server.

An important feature of the use of the MAC table by Ethernet bridges is the ability to update its contents if the network is reconfigured. For example, if an End Station is moved to another connection port, if an End Station is replaced with a different End Station, if it is switched off or fails or in the event of a network bridge failure. This is achieved by incorporating an aging out process: MAC table entries are removed if they have not been referenced for some pre-defined period of time. Should a frame arrive in the bridge with an aged-out table entry as its destination address, then rediscovery of the correct egress port for that entry must be performed again.

In order to illustrate this point, FIG. 3 shows the same network 20 as described in relation to FIG. 2, but one client 16c has been disconnected from the first bridge 12a and reconnected to a port 22b of the second bridge 12b. If the MAC tables are unchanged from the FIG. 2 configuration, then a frame sent by the servers 18 with the MAC address of this client 16c as destination is sent to the second bridge 12b, then on to the first bridge 12a. The first bridge 12a recognises that the previously correct egress port 14c is no longer connected to anything, and so the frame is discarded.

The problem caused by such reconfiguration is mitigated by aging out unused entries from the MAC table. As the reconnected client 16c is no longer connected to the first bridge 12a, no frames containing that client's MAC address as source will be received by the second bridge 12b through the link 24 connecting the two bridges. After a set timeout period, the MAC table entry for the reconnected client 16c in the second bridge 12b (indicating link 24) is accordingly deleted. The reconnected client 16c sends no frames from its new connection port as it is waiting for a communication from the server 18. Once the entry in the MAC table is deleted, any subsequent frame destined for the reconnected client 16c is flooded out of all ports 22a-h on the second bridge, except the ingress port. The frame will now be received by the destination client 16c at its new connection port 22b. The reconnected client 16c is then able to complete its conversation, and its own reply in which its address is contained as source results in its details, with new connection port, being reloaded into the second bridge's MAC table.

The aging-out facility is typically implemented with a reference bit in the MAC table that is set each time the relevant MAC table address is accessed. This is done whenever the relevant End Station issues a frame, which therefore contains its MAC address as source, or if a frame is received that is destined for that End Station. If the address is a source address, the MAC table is consulted to ascertain whether that address has been previously loaded, or if it now needs to be written. In either case, the reference bit is set as the table is consulted. If the address is a destination, the table is consulted to determine the appropriate routing, and the reference bit is set. Then at regular, but infrequent, intervals the reference bit is cleared. If an attempt to clear the reference bit finds that it is already clear then the MAC address entry is assumed to be invalid and is deleted. Regularly-accessed MAC table entries remain valid as the reference bit will be set at a frequency greater than the clearance rate determined by the age-out period.

It will be appreciated that the above description relating to a client/server application, and indeed those that follow, are for the sake of example only. Many other communication protocols are employed between Ethernet End Stations, however most have in common a similar two-way or full duplex conversation. Accordingly, the same underlying fundamental Ethernet discovery and routing protocols are used. In particular, the mechanism by which MAC address tables are populated, as described above, is the same for all Layer 2 protocols that rely on source and destination MAC addresses to control discovery and routing.

Another example is provided by the Address Resolution Protocol (ARP), which is used to translate an IP address into a MAC address. End Stations normally identify each other using an IP address. In following the ARP, a source End Station sends a request into the network, encapsulated in an Ethernet frame in which the destination MAC address is unknown. This request is flooded into the network until it ultimately reaches the destination End Station or an End Station which has already determined the IP to MAC address translation. The destination MAC address is copied into a return frame header and sent back to the originating End Station. During address resolution the outgoing frames and subsequent returning frames populate the interposing Ethernet bridge MAC address tables with the source MAC address to port associations.

Regardless of the protocol details, the automatic learning of Ethernet routes, with its facility for dynamic updating, represents a huge simplification for network administrators in comparison with other networks. For small networks, Ethernet provides a highly effective means of communication. For larger networks however, the problems caused by the additional network traffic generated by floods may outweigh the advantages of simplification. The term "larger network" is to be taken to include both networks with a large number of bridges and networks that include a bridge with a very high port count. If the network has thousands or tens of thousands of ports then each missing MAC table entry converts a single frame, perhaps using a small number of bridge connections, into thousands of copies of the same frame that arrive at every Intermediate and End Station in the whole network.

In a situation in which many stations send frames to unknown destination MAC addresses (i.e. to stations whose entries are not present in the bridges' MAC tables), the whole network can become saturated with floods. It is not uncommon to find that many of the flooded frames are looking to find a route to the same destination MAC address. Multiple frames arriving at a bridge from many sources looking for the same destination will each cause their own cascading flood throughout the network. This in itself can severely affect network performance, but flooding over a large network, constructed from many bridges with multiple possible routes between End Stations can lead to a situation that can cause complete network collapse. In such multi-path networks, the possibility of a broadcast storm caused by multiple bridges simultaneously flooding frames grows with the network dimension.

A traffic pattern that causes a broadcast storm will be described with reference to a network configuration 30 shown in FIG. 4. In FIG. 4, first 12a, second 12b and third 12c bridges are connected together. The client 16 is connected to the first bridge 12a and the servers are connected to the second bridge 12b. With the bridges' MAC tables unpopulated, the client 16 issues a frame with a particular server 18 as destination. The frame is flooded by the first bridge 12a, respective copies being sent via links 24a, 24b to both the second 12b and third 12c bridges. These bridges 12b, 12c, in turn, flood the frame out of all ports other than the ingress port, that is, everywhere except back to the first bridge 12a. As a result, the second bridge 12b sends the frame to the third bridge 12c using link 24c and the third bridge 12c sends to the second bridge 12b also using link 24c. A second flood wave follows, as neither bridge 12b, 12c has the server's MAC address, in which the frame is flooded by both bridges 12b, 12c back to the first bridge 12a. The first bridge 12a will then, in turn, flood back to the second 12b and third 12c bridges, and so on. These frames are endlessly flooded around the bridges 12a, 12b, 12c, multiplying at every step, until the network 30 is completely congested by the broadcast storm. The destination server 18 will of course receive the frame itself but, in the time taken to receive, interpret and issue a reply with itself as source, the network may become too congested to accept a response.

The example described above contains only three bridges. Larger networks may contain hundreds or thousands of bridges in which the storm will escalate quickly. This results in widespread network congestion at best and often causes complete network collapse. The storm is amplified at each bridge as multiple copies of an ingress flood frame are sent out of every egress port. The network grinds to a halt under the increasing load of flooded frames, preventing any other traffic between unrelated sources and destinations from making progress.

From the above, it can be seen that the term "broadcast storm" is used to describe what is, effectively, an out-of-control flood. Use of the cascading flood is part of the normal discovery process for Ethernet networks: an unknown destination MAC address instigates a flood out of all except the input port that may then cause another flood at the next bridge and so on. The damage, although potentially severe, is that the available network bandwidth becomes taken up by traffic caused by too many unknown destination MAC addresses. A broadcast storm on the other hand arises with network loops. A unicast, multicast or cascading flood may then be caught in the loop, going around endlessly, continually recreating itself.

Cascading floods and broadcast storms are also likely to occur if a portion of the network becomes broken. This can be particularly severe if one of the bridges in the network fails, making many active End Stations inaccessible. Initially all the frames destined for these End Stations would still be directed to the broken bridge but then the MAC table entries for the inaccessible End Stations would start to age out. There could be hundreds or thousands of End Stations that would normally be accessed through the broken bridge. Without any additional controls each of these thousands of conversations to these endpoints becomes a flood that is sent to all of the other tens of thousands of endpoints. The network is suddenly faced with having to cope with millions of frames where every one is going to arrive at the wrong destination and would ultimately have to be discarded. When this happens the normal traffic between otherwise unrelated End Stations is totally swamped by the flood traffic, which causes very severe network congestion. In order to manage the severe congestion the vast majority of frames end up being discarded. Even the unrelated network traffic must then generate retries and everything grinds to a halt.

In the prior art various attempts have been made to mitigate the damage caused by cascading floods and broadcast storms. Many of these restrict the rate that flood data is released on an egress port. Restricting the output data rate however causes the Ethernet frames to buffer at the ingress ports. This, in turn, blocks the passage of subsequent Ethernet frames received on the same ingress port, causing upstream network congestion. That is, the problem of network congestion remains: traffic unrelated to the flood traffic will now be communicated through the storm, but it will be delayed as a result of being queued with the flood traffic.

In a multi-path network, such as shown in FIG. 4, the effect of a broadcast storm can be particularly severe. A choice of multiple routes between a source and destination permit frames to arrive at a particular Intermediate Station from more than one segment, each attached to independent ingress ports. One approach to reduce the effects is through adoption of a protocol such as the IEEE standard Rapid Spanning Tree Protocol (RSTP). The RSTP ensures that a single route is maintained between each source and destination. Whilst it still permits the possibility of reconfiguring a route in the event of breakdown, enforcing a single route removes the significant gain to be achieved from allowing traffic to use the entire capacity of the network. Moreover, these protocols do not solve the problem completely. There inevitably remains the possibility of multiple active paths through a network, arising as a result of hardware or software failure, incorrect configuration or reconfiguration. In fact, a common occurrence of a broadcast storm is in a loop that has not been correctly configured out by the RSTP. Finally, the RSTP is not a requirement of the Ethernet, nor is it a part of the fundamental transfer mechanism used to move frames from a source to a destination.

A second approach taken in the prior art is to limit the extent of damage that can be caused by broadcast storms through the use of Virtual Local Area Networks (VLANs) and Layer 3 routing. A VLAN is a group of End Stations with a common set of requirements that appear to be connected together on a single Ethernet segment. They can be physically separated on different segments and, similarly, End Stations on the same segment can be artificially separated by assigning them to separate VLANs. VLANs simplify the reconfiguration of a network by allowing software to perform the grouping function as though the ports had been physically reconfigured. A number of different VLANs can be connected through mappings in a Layer 3 router, but are considered separate by the Layer 2 bridges that are susceptible to broadcast storms. By splitting up the Ethernet network into many separate VLANs and allowing communication between VLANs to be performed by Layer 3 routing the resulting potential broadcast storms are restricted to a single VLAN. The disadvantage of VLANs lies in the amount of configuration required to set them up and manage them. Even within a small network VLANs add complexity to network administration and the segmentation of a larger network becomes an administrative burden, particularly as the number and type of connected devices increase.

In summary, the risk of a cascading flood and broadcast storm severely limits the size of Ethernet network that can function effectively. Prior art methods of mitigating against the effects of a broadcast storm still result in network congestion, or limit the size and/or capability of a network to perform at its full potential. There is accordingly a perceived need to provide an alternative method of mitigating against the effects of a broadcast storm or cascading flood and, ideally, that is capable of preventing broadcast storm generation.

The present invention provides a method of limiting the frequency of floods within a data network, the floods arising as a data frame is routed to an unknown destination, the method comprising the steps of:

(a) receiving on an ingress port a data frame intended for a destination station and containing a MAC address of that station;

(b) checking the destination MAC address with the contents of a MAC table; and thereby (c) determining whether the data frame is to be routed, discarded or flooded to all ports except the ingress port; and (d) respectively routing, discarding or flooding the data frame to all ports except the ingress port, as determined in Step (c).

In contrast to the prior art methods of controlling cascading floods, this method results in a decision being made at the ingress port for a frame. Accordingly, the frame may be discarded immediately, without being buffered, which results in significantly less congestion and, in particular, network traffic that is not connected with the destination MAC address contained within the frame is substantially unaffected by the floods generated as the MAC addresses are learned.

The MAC table ideally contains data in which a MAC address is mapped to a port number and to a flag value, the flag value being set to provide an indication to data frames that contain the MAC address as destination that the port number does not indicate an egress port to that destination. The flag value is an additional entry in a MAC table, not known in the prior art. It has a bearing on how frames containing that MAC address as destination are treated in accordance with this invention.

In the event that the destination MAC address is not found in the MAC table at Step (b) above, then the method preferably comprises the steps of:

(a) writing the MAC address and ingress port to the MAC table;

(b) setting the flag value; and (c) flooding the data frame to all ports, except the ingress port.

This is a significant difference from the prior art. A destination lookup is permitted to create an entry in a MAC table, with the flag being set to indicate that it is not a true (source created) entry. This provides a means by which the method of the present invention can be implemented using currently available MAC table architectures and access routines.

In the event that the destination MAC address is found in the MAC table, then the method may further comprise determining whether the flag value is set. If the flag value is not set, then the data frame is preferably routed to the port number indicated in the MAC table. If the flag value is set, the method may then further comprise determining whether the mapped port number found in the MAC table matches that of the ingress port. If a match is not found, then the frame is discarded. On the other hand, if a match is found and a count value (if present) is also greater than zero then the count value is decreased by one and the data frame is flooded to all ports, except the ingress port.

In this way only the port on which the original entry-creating frame arrived is permitted to issue a flood seeking that particular destination. The number of floods is further limited by optionally setting a count value. This embodiment provides an effective means with which to limit the number of floods that may be issued within a network as it seeks to learn egress port to MAC number mappings. This effectively prevents congestion within a network and avoids the generation of a broadcast storm.

If the data frame originates from a source whose MAC address is also contained within the frame, the method may then comprise the steps of:

(a) checking the source MAC address with the contents of the MAC table; and, if the source address is absent or if the flag value is set, (b) writing the source MAC address and ingress port to the MAC table; and (c) clearing the flag value.

This provides an effective means by which true (source-created) MAC table entries can overwrite destination-created entries, and be marked as such within the table.

In a further embodiment, at periodic intervals and where the flag value is set, a MAC table entry may be cleared or otherwise indicated to be considered as clear. This aging out process is used to permit frames arriving on another ingress port to issue floods seeking the destination MAC address in the event that the earlier search is unsuccessful after a reasonable number of attempts.

Aging out may be implemented by allowing each entry within the MAC table to contain an Aging Value and the entry is cleared whenever the Aging Value reaches a predetermined value. Alternatively, each entry within the MAC table may contain a second flag, which is set at periodic intervals in order to indicate that the entry is to be considered as clear.

Within the MAC table it is worth noting that, on occasion, a MAC address may be mapped to multiple port numbers, which indicate multiple egress ports. The MAC address in this instance will have a recognised format that indicates that it is part of a multicast group. During a multicast operation a frame is routed to 0, 1, 2 or more ports, up to a limit of all available ports except the frame ingress port.

The data network may comprise at least two Ethernet bridges. Alternatively and, preferably, it comprises an Ethernet bridge with more than 32 ports. Such high port-count Ethernet bridges are particularly susceptible to broadcast storms and the method of this invention provides a means by which they can be prevented. High port-count bridges may be implemented on single or multiple computer chips.

In a second aspect, the present invention provides an Ethernet bridge through which data propagation is controlled in accordance with the method detailed above.

In a third aspect, the present invention provides a method of populating a MAC table within an Ethernet network with entries relating a MAC station address to a port to which it is connected, the method comprising the steps of:

(a) receiving on an ingress port a data frame intended for a destination station and containing a MAC address of that station;

(b) checking the destination MAC address with the contents of a MAC table; and thereby (c) determining whether the destination MAC address and ingress port are to be written to the MAC table and, if so (d) writing the destination MAC address and ingress port to the MAC table; and (e) flooding the data frame to all ports except the ingress port.

This provides a novel method of populating a MAC table in which MAC addresses that appear in the destination address of a frame are permitted, under certain conditions, to be entered into the table. Such a MAC table is particularly useful in controlling floods issued in an Ethernet network seeking to find unknown destinations.

Preferably each entry in the MAC table contains a flag value, the flag value being set as the destination MAC address is written to the table. In this way, the destination MAC address and ingress port may not be written to the MAC table if an entry for that address is found and the flag value is not set.

In order to permit overwriting of destination-created entries, if the data frame originates from a source whose MAC address is also contained within the frame, the method may also comprise the steps of:

(a) checking the source MAC address with the contents of the MAC table; and, if the source address is absent or if the flag value is set, (b) writing the source MAC address and ingress port to the MAC table; and (c) clearing the flag value.

In a fourth aspect, the present invention provides a data storage medium containing a rewritable MAC table for use by an Ethernet bridge, the MAC table containing entries in which a MAC address of a network station is mapped to a bridge port number and a flag value, each MAC address being mapped to a port number corresponding to an ingress port on which a data frame reaches the bridge and characterised in that the flag value is set to indicate whether the mapping was created as a result of a source address lookup or destination address lookup.

This novel structure of a MAC table is particularly useful in controlling the generation of floods as an Ethernet network learns the destination addresses of the various network components connected to it.

The flag value may be set if the entry is created as a result of a destination MAC address lookup and cleared if the entry is created as a result of a source MAC address lookup.

Further, each MAC entry may additionally contain a count value which is set to decrement each time the MAC entry is accessed as a result of a frame arriving on an ingress port of the bridge that corresponds to the port number of that entry and which contains the MAC address as destination, until the count reaches zero.

Embodiments of the invention will now be described by way of example only and with reference to the accompanying drawings.

Figure 1:
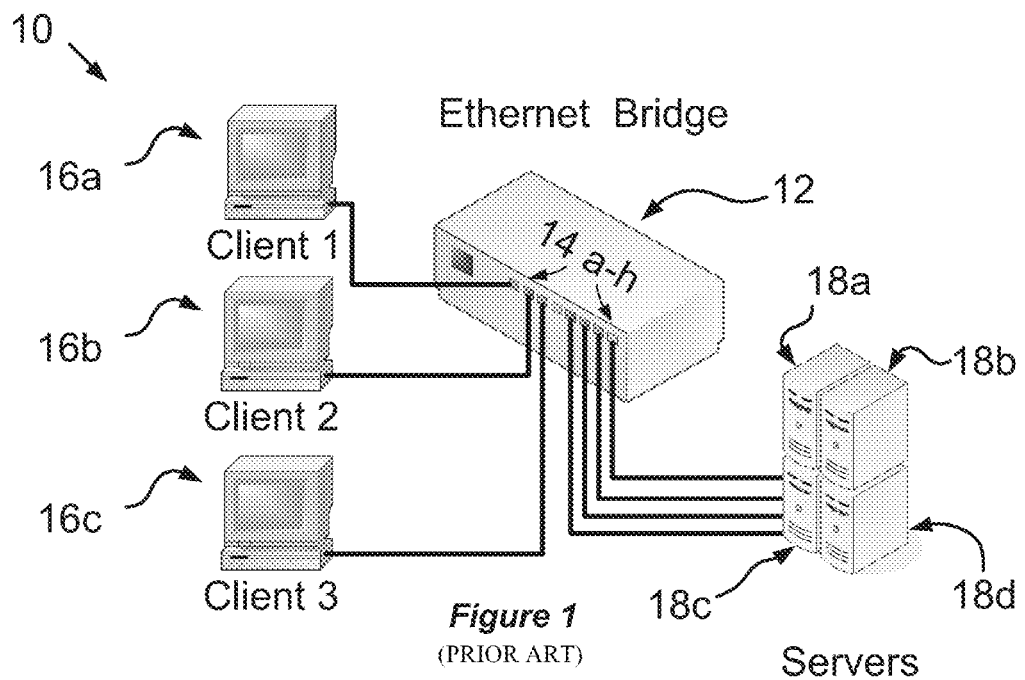
FIGS. 1 to 4 are schematic illustrations of components forming an Ethernet network, of varying complexity, as known in the prior art, the networks being suitable for implementation of a method in accordance with the present invention.
Figure 2:
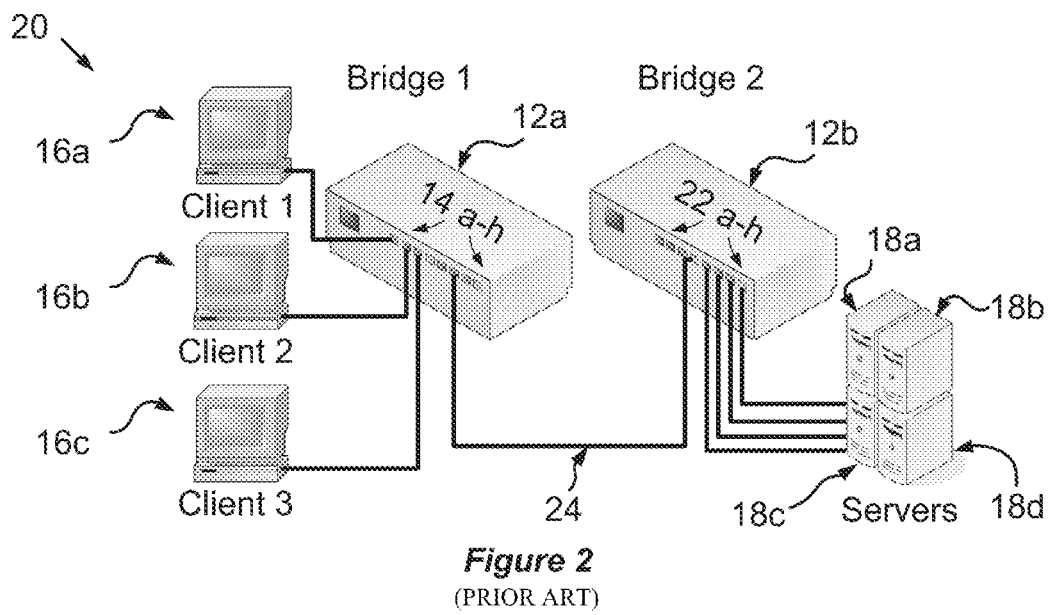
Figure 3:
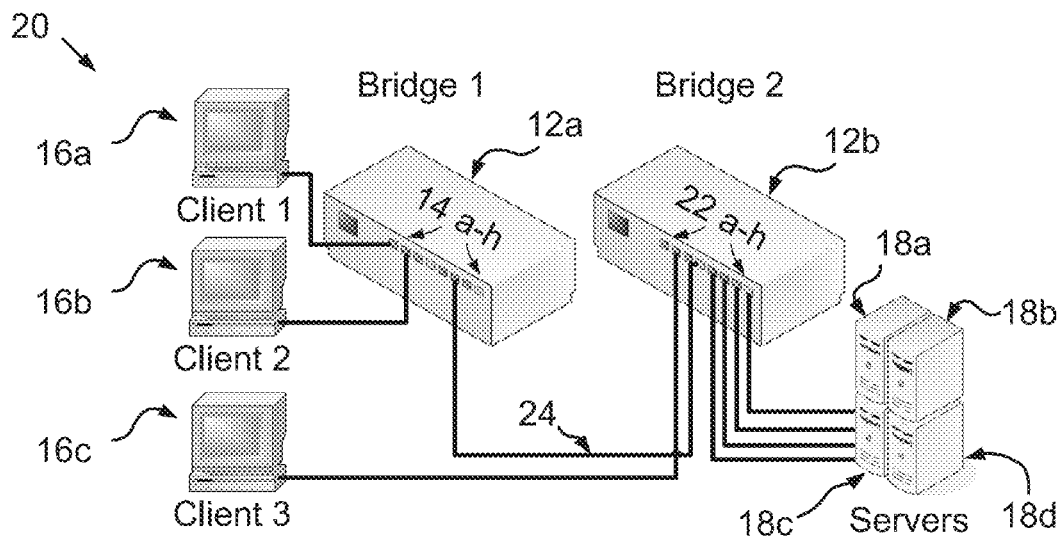
Figure 4:
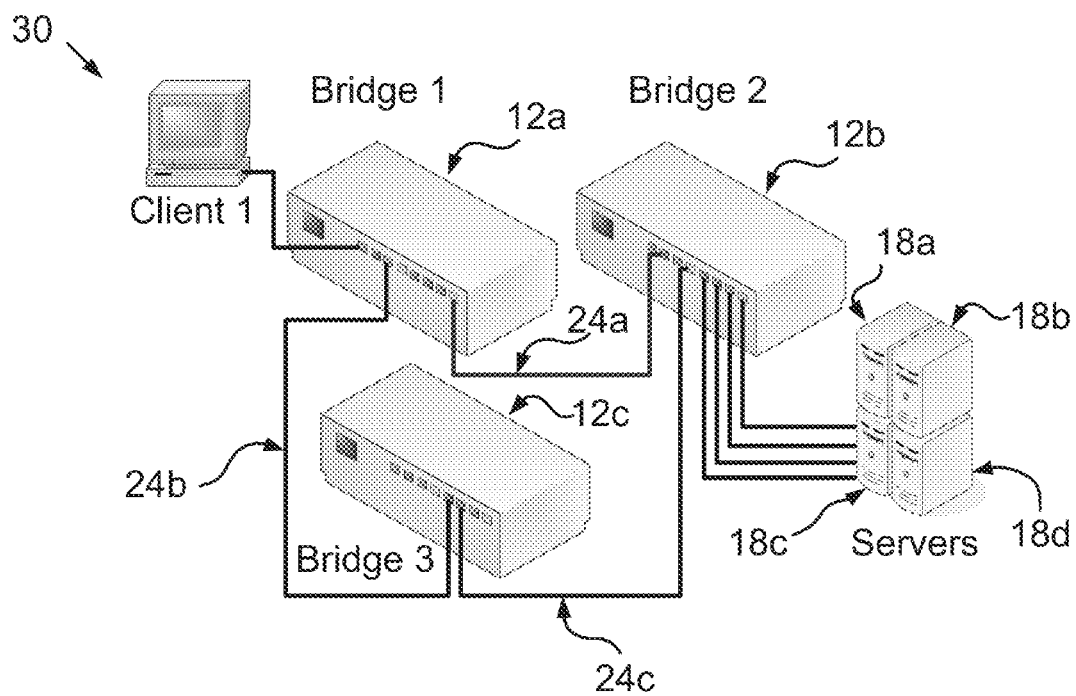
Figure 5:
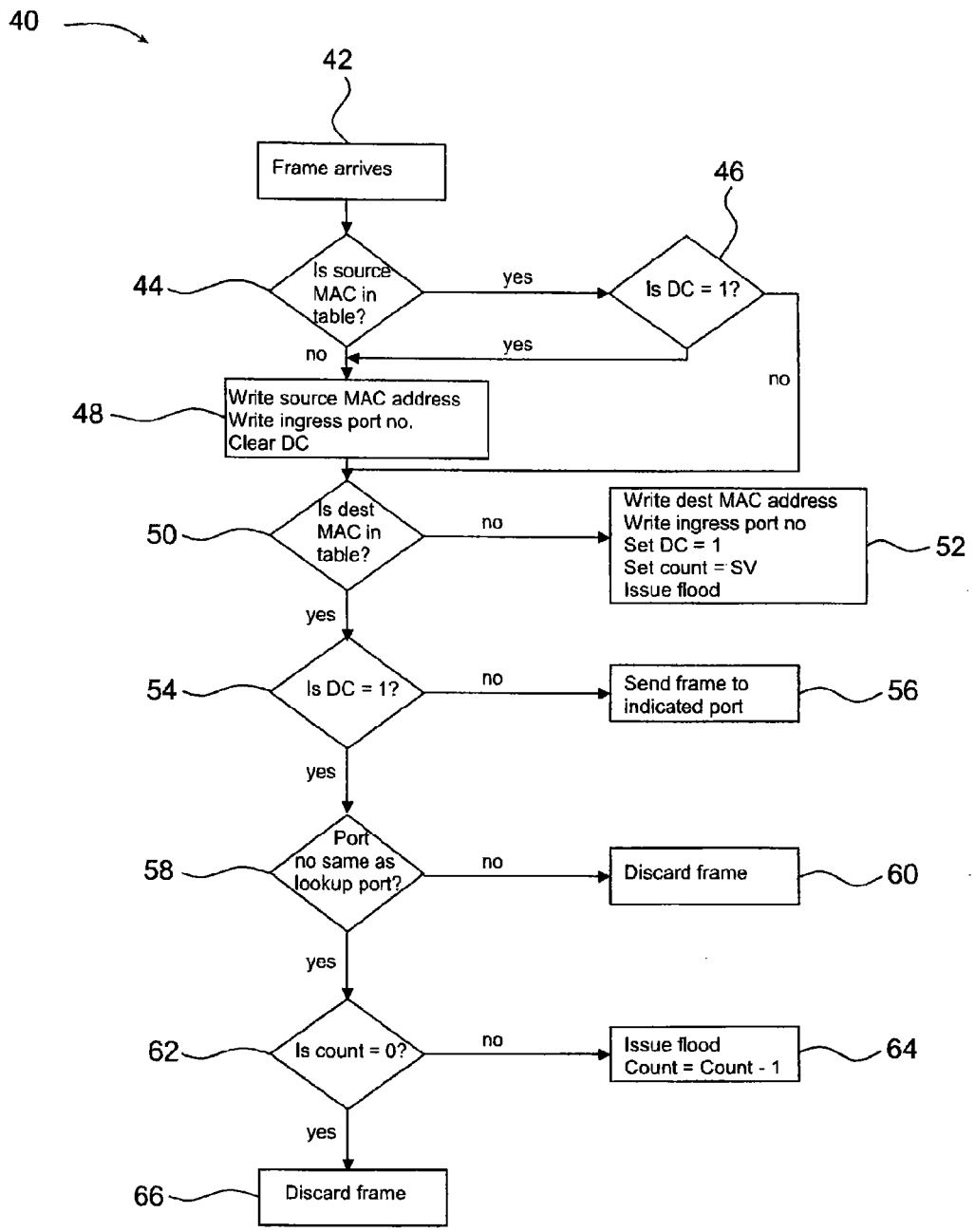
FIG. 5 is a flow diagram indicating the process steps involved in populating a MAC table in accordance with the present invention.

Referring now to FIG. 5, a process 40 of populating and using Ethernet bridge MAC table addresses in accordance with the present invention will now be described. As in the prior art, the populating process is followed at start up and if, as a result of aging out, a MAC table entry is not found for a particular destination address. Otherwise, a general routing procedure is followed. The idea behind this invention is to permit a MAC table entry corresponding to the destination address contained in a frame to be created during the learning process. The destination MAC address is written to the MAC table, along with the ingress port on which the frame arrived. Obviously this port number will not correspond to the correct egress port for the destination End Station and accordingly this entry cannot be used for data routing. In order to flag this situation, an additional bit, the Destination Created (DC) bit, is set in the MAC table entry. The procedure is described more fully below.

At step 42 a data frame arrives at a bridge for onward transmission. The frame includes a header in which source and destination MAC addresses are indicated. At step 44 the bridge's MAC table is searched for the source address of the frame. If the address is already loaded, action is then taken to check whether the entry is valid i.e. if it was created as a source address. At step 46 therefore, the DC bit is checked. If it is clear (or zero), the MAC table entry is valid and so no further action regarding the source address is taken, beyond setting a reference bit (not shown), if aging out is implemented. If on the other hand, the DC bit is found to be 1, i.e. the MAC table entry was created by a destination lookup, the entry is not valid and is therefore overwritten. Accordingly, if the source MAC address is not found, or if it is destination-lookup created, then at step 48, the source MAC address and the bridge port number at which the frame arrived are written to the MAC table, as in the prior art. The DC bit is then cleared. Again, the reference bit is set, if aging out is implemented.

The MAC table is then searched 50 for the address of the destination. If the destination MAC address is absent then, in accordance with this invention, the destination MAC address is written 52 to the MAC table, along with the ingress port on which the frame arrived. The DC bit is set to indicate that this is not a valid entry that can be used for data routing. Finally, a count value is also initialised to a predetermined or programmable starting value (count=SV). In order to find the correct egress port for the destination MAC address the bridge will, as in the prior art, flood the frame to all ports except the ingress port.

In the event, that the destination lookup does find an entry in the MAC address table, the entry is checked 54 for its validity i.e. is it created by a source lookup, and therefore with a valid egress port entry, or a destination lookup? This is done by reference to the DC value. If DC=0, the entry was created by a source lookup and so the frame is sent 56 to the indicated port. If DC=1, the entry was created by a destination lookup, which has not yet been overwritten.

A next step is to check the ingress port number of the present frame against the port number stored in the MAC table. If the port numbers do not match then, in accordance with this invention, the frame is simply discarded 60. If the port numbers do match, then the count value within the MAC table entry is checked 62. Provided the count is above zero, the bridge will issue another flood 64 in order to make another attempt to find the correct egress port for the routing. At the same time the count is decreased by 1. Once the count has reached zero, no further floods are permitted of frames reaching the bridge by that particular ingress port and that are seeking that specific destination MAC address. If the count=0 therefore, the frame is discarded 66. Similar frames, that is, with the same source and destination MAC addresses will continue to be discarded until the destination MAC table entry is aged out. If the entry is aged out, it will no longer be valid and accordingly a subsequent lookup will not find that address in the MAC table at step 50. This permits a new flood sequence to attempt to learn the address.

Steps 58 to 66 described above are critical to limiting cascading floods. By step 58, the DC MAC table entry has already been created and, accordingly, at least one flood has been issued at step 52. Only frames that arrive at the same ingress port are permitted, by the method of this invention, to be flooded in order to find the same destination. Any frames destined for the unmapped MAC address that arrive on other ingress ports are discarded 60. This behaviour prevents any ingress port other than one specific port from broadcasting packets seeking a specific destination. The specific port that is permitted broadcasts is the port that was ingress for the original frame that caused the entry to be created. Furthermore the number of floods that may be issued by that port is limited by the count value. That is, no further frames will be broadcast once the count reaches zero. Clearly, if only one flood is permitted then this additional count value is not required as the existence of a MAC table entry with DC=1 indicates that one flood has already been broadcast.

As in the prior art, entries created in the MAC address table by source address lookups may be aged out after some period of time in order to allow the associated port/MAC address mapping to be re-learnt. In this invention, aging out may also be implemented for entries created by the destination address lookup. This destination aging will not however necessarily be at the same rate as source aging. This is because the two aging processes are for different purposes. That of the source address is to allow for network reconfiguration. Aging the entries created by the destination address provides a method for re-enabling the right to flood a frame, essentially by clearing the MAC table entry. The rate at which destination-created entries are aged out will control the amount of broadcasting that occurs due to unknown addresses.

In a further embodiment, a switch management entity is arranged to monitor the volume of unknown address broadcasting and to vary the age out period in response. In this way, the effect of the broadcast on other traffic can be appropriately limited. Once an entry has been aged out a subsequent destination lookup would recreate 52 the entry and so be permitted to generate a new flood of the Ethernet frame. That is, another ingress port has the opportunity to prompt a sequence of packets as a broadcast.

In an alternative embodiment, rather than implementing an aging out process, a separate control flag is included in the MAC table. If the flag is clear, then an unknown destination lookup will have the right to flood the frame. That is, the flag is set on an initial lookup 52, to indicate essentially that the route to the destination address is currently being learnt, and cleared after a certain predetermined time, for example, when the count value reaches zero. This allows the learning procedure to be restarted in the event that the current attempt fails.

Implementation of the present invention, in combination with the destination lookup aging out function, restricts the frequency at which floods can be generated to a limited number per age-out period. This is regardless of the number of ports attempting to direct frames to this destination MAC address. For example, consider a network in which a bridge, or collection of bridges, is connected to ten thousand End Stations, one thousand of which suddenly disappear as a result of a hardware fault at a time that each End Station is having a conversation with a still-working End Station. If the maximum number of floods per MAC entry is set to one each time a MAC entry is created, then a maximum of one thousand floods will occur every timeout period. If the timeout period is set to ten seconds then only one hundred floods would occur each second. This rate is manageable by most networks and would not significantly affect other routing activity involving conversations independent of the broken hardware.

Figure 6:
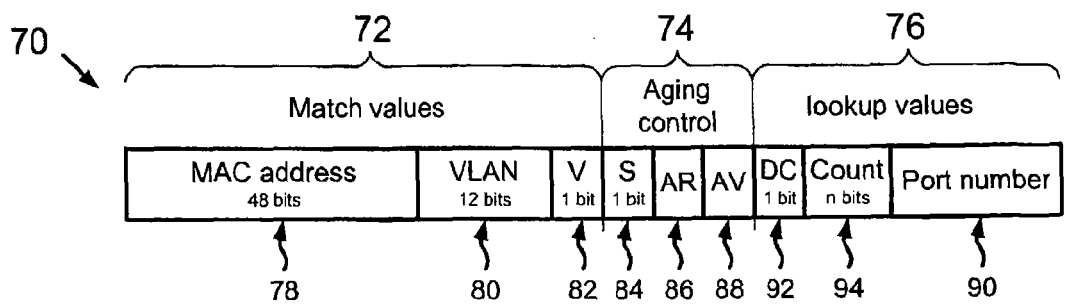
FIG. 6 is a bit map showing the layout of a MAC table entry, the table being suitable for use with a method of the present invention.

Turning now to FIG. 6, there is shown a layout 70 of a MAC table entry, suitable for use with the method of this invention. The entry 70 is in the form of a sequence of bits in a memory register, or other data storage means. Each entry 70 is subdivided into Match value bits 72, Aging control bits 74 and Lookup value bits 76.

The Match value further comprises a field 78 of 48 bits, which stores the MAC address of an End Station (not shown), a field 80 of 12 bits which stores the VLAN number, if the network has been configured into VLANs, of which the End Station is a member and a single bit 82 to indicate whether or not the values entered for this MAC address are valid. The Match value 78 is compared with the MAC address and VLAN number (if it exists) of an incoming Ethernet frame. If the entry has not yet been loaded or has been aged out then the "valid entry" bit 82 will not be set, which indicates that any entries that happen to be on this line 70 of the MAC table are to be ignored, and the search for a match with the incoming frame continues on to other entries.

The Aging control values 74 are used to determine how long a MAC table entry is to remain valid. These values 74 include a single Static bit 84, which, if set, indicates that the entry must never be aged out, an Age Rate field 86 and an Age Value field 88. The Age Rate 86 is used to control the Age Value 88 field and is allocated sufficient bits to define all desired rates of aging. Typically, this is a single bit with a slow age rate of perhaps 5 minutes and a fast age rate of just a few seconds. The Age Value field 88 is also usually allocated a single bit, but this could be more. The Age Value field 88 is reset whenever the MAC entry is accessed. The value 88 is updated by adding 1 at the rate defined by the Age Rate field 86. If an update causes the value to increment back to zero then the "Valid Entry" field 82 is cleared. The entry has therefore been aged out and the clearing of the Valid Entry field 82 causes any subsequent match request to ignore that MAC table entry. If the Age Value field is a single bit then two increments are required for invalidation: the first increment sets the bit and the second increments it back to zero.

The Lookup value 76 comprises three fields: a port number field 90, a Destination Created bit 92 and a Count value 94. The port number field 90 contains data identifying the ingress port of the frame containing the original request to create the entry. For a source MAC address lookup this will be the source port number, which is used to route frames when a destination port lookup is made. The original source MAC address lookup that created the MAC table entry loads the port number value. The Destination Created bit 92 is cleared on a source created entry. For an entry created by a destination address lookup, the port number field 90 still contains data identifying the ingress port of the original request to create the entry, but this value is not valid for routing purposes and so the Destination Created bit 92 will be set to 1. The Count value is only valid when the DC bit is set. This Count is loaded with a predefined or programmable value whenever the entry is created by a destination address lookup. The Count value is decremented by 1, until it reaches zero, whenever a destination address lookup is made on the entry by an ingress port with matching port number, while DC=1.

In one embodiment, the Count value is not present in the MAC table. This therefore permits only one flooded packet each time the destination address lookup creates an entry. It is expected that this embodiment will be sufficient for most communication protocols using the Ethernet bridge.

As will be understood by one skilled in the art, not only is the present invention capable of limiting the frequency at which floods can be generated within a network and therefore avoid the deleterious effects of a broadcast storm, but it can also be implemented using currently-available architectures within an Ethernet bridge. The mechanisms that are currently employed to manage MAC table entries for source MAC addresses may be reused to provide flood limiting. The only addition is to allow destination MAC table lookups also to be capable of creating MAC table entries. The majority of the required mechanisms already exist for source MAC table accesses and these can readily be reused by the destination lookups.

Prior art methods of controlling the effects of cascading floods and so preventing broadcast storms rely on restricting the rate that flood data is released on an egress port. This causes the Ethernet frames to buffer at the ingress port, which, in turn, blocks the passage of subsequent Ethernet frames received on the same port, By way of contrast, the method of this invention will either flood or discard the frame. This decision is taken on the ingress port and this port accordingly will have no need to block or buffer the frame. By permitting only limited flooding, an important feature of this invention is that other non-flood Ethernet frames with valid egress port mappings returned from the MAC address table remain routed at full rate. That is, congestion is minimised.

The method described in relation to FIG. 5 and the format of MAC table entries described in relation to FIG. 6 can be advantageously implemented in large networks, or in bridges with a large number of ports, in which the consequences of a cascading flood or broadcast storm could be disastrous. Currently available Ethernet bridges have up to 32 ports and if only two of these are linked in a network then the likelihood is that the network will be subject to the problems of a broadcast storm. Future development however envisages Ethernet bridges with a very high (>>32) port count and the present invention can advantageously be implemented in such bridges. A single high port-count bridge may be realised using multiple computer chips or its components may even be within separate metal box enclosures, which may be physically separated by many meters of federating cables.

The invention claimed is:

1. A method of limiting the frequency of floods within a data network, the floods arising as a data frame is routed to an unknown destination, the method comprising the steps of:
   (a) receiving on an ingress port a data frame intended for a destination station and containing a Medium Access Control (MAC) address of that station;
   (b) checking the destination MAC address with the contents of a MAC table; and thereby
   (c) determining whether the data frame is to be routed, discarded (60, 66) or flooded (52, 64) to all ports except the ingress port; and
   (d) respectively routing, discarding or flooding the data frame to all ports except the ingress port, as determined in Step (c), wherein the MAC table contains data in which a MAC address is mapped to a port number and to a flag value, the flag value being set to provide an indication to data frames that contain the MAC address as destination that the port number does not indicate an egress port to that destination.

2. The method according to claim 1 wherein in the event that the destination MAC address is not found in the MAC table at Step (b), then the method comprises the steps of:
   (a) writing the MAC address and ingress port to the MAC table; (b) setting the flag value; and
   (c) flooding the data frame to all ports, except the ingress port.

3. The method according to claim 1 wherein in the event that the destination MAC address is found in the MAC table at claim 2, Step (b), then the method further comprises determining whether the flag value is set.

4. The method according to claim 3 wherein if the flag value is not set, the data frame is routed to the port number indicated in the MAC table.

5. The method according to claim 3 wherein if the flag value is set, the method further comprises determining whether the mapped port number found in the MAC table matches that of the ingress port.

6. The method according to claim 3 wherein if the mapped port number does not match that of the ingress port, the frame is discarded.

7. The method according to claim 6 wherein if the mapped port number matches that of the ingress port then the frame is discarded unless a count value is greater than zero.

8. The method according to claim 7 wherein if the count value is greater than zero, the count value is decreased by one and the data frame is flooded to all ports, except the ingress port.

9. The method according to claim 1 wherein the data frame originates from a source whose MAC address is also contained within the frame, the method comprising the steps of:
   (a) checking the source MAC address with the contents of the MAC table; and, if the source address is absent or if the flag value is set,
   (b) writing the source MAC address and ingress port to the MAC table; and
   (c) clearing the flag value.

10. The method according to claim 1 wherein, at periodic intervals, where the flag value is set, a MAC table entry is cleared or otherwise indicated to be considered as clear.

11. The method according to claim 10 wherein each entry within the MAC table contains an Aging Value and the entry is cleared whenever the Aging Value reaches a predetermined value.

12. The method according to claim 10 wherein each entry within the MAC table contains a second flag, which is set at periodic intervals in order to indicate that the entry is to be considered as clear.

13. The method according to claim 1 wherein a MAC address is mapped to at least two port numbers.

14. The method according to claim 1 wherein the data network comprises at least two Ethernet bridges.

15. The method according to claim 1 wherein the data network comprises an Ethernet bridge with more than 32 ports.

16. The method according to claim 15 wherein the Ethernet bridge is implemented on multiple chips.

17. An Ethernet bridge wherein data propagation through the bridge is limited by a method in accordance with claim 1.

18. A method of populating a MAC table within an Ethernet network with entries relating a MAC station address to a port to which it is connected, the method comprising the steps of:
   (a) receiving on an ingress port a data frame intended for a destination station and containing a MAC address of that station;
   (b) checking the destination MAC address with the contents of a MAC table; and thereby
   (c) determining whether the destination MAC address and ingress port are to be written to the MAC table and, if so
   (d) writing the destination MAC address and ingress port to the MAC table; and
   (e) flooding the data frame to all ports except the ingress port, wherein each entry in the MAC table contains a flag value, the flag value being set as the destination MAC address is written to the table.

19. The method according to claim 18 wherein the destination MAC address and ingress port are not written to the MAC table if an entry for that address is found and the flag value is not set.

20. The method according to claim 19 wherein the data frame originates from a source whose MAC address is also contained within the frame, the method comprising the steps of: (a) checking the source MAC address with the contents of the MAC table; and, if the source address is absent or if the flag value is set,
   (b) writing the source MAC address and ingress port to the MAC table; and
   (c) clearing the flag value.

21. A device containing a rewritable MAC table for use by an Ethernet bridge, the MAC table containing entries in which a MAC address of a network station is mapped to a bridge port number and a flag value, each MAC address being mapped to a port number corresponding to an ingress port on which a data frame reaches the bridge and characterised in that the flag value is set to indicate whether the mapping was created as a result of a source address lookup or destination address lookup.

22. The device according to claim 21 wherein the flag value is set if the entry is created as a result of a destination MAC address lookup and cleared if the entry is created as a result of a source MAC address lookup.

23. The device according to claim 22 wherein each MAC entry additionally contains a count value which is set to decrement each time the MAC entry is accessed as a result of a frame arriving on an ingress port of the bridge that corresponds to the port number of that entry and which contains the MAC address as destination, until the count reaches zero.

* * * * *